(12) United States Patent
Kim

(10) Patent No.: US 7,861,524 B2
(45) Date of Patent: Jan. 4, 2011

(54) MASTER CYLINDER OF BRAKE

(75) Inventor: Seong Hun Kim, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 374 days.

(21) Appl. No.: 12/041,847

(22) Filed: Mar. 4, 2008

(65) Prior Publication Data
US 2008/0216473 A1  Sep. 11, 2008

(30) Foreign Application Priority Data
Mar. 9, 2007  (KR) .................... 10-2007-0023413

(51) Int. Cl.
*B60T 11/16*   (2006.01)
*B60T 11/232*  (2006.01)

(52) U.S. Cl. .......................... 60/585; 60/588
(58) Field of Classification Search ............ 60/585, 60/586, 588
See application file for complete search history.

(56) References Cited

U.S. PATENT DOCUMENTS

| | | | |
|---|---|---|---|
| 6,318,082 B1 * | 11/2001 | Hirayama | ............... 60/588 |
| 6,463,737 B2 | 10/2002 | Inoue et al. | |
| 6,907,732 B2 | 6/2005 | Masuda et al. | |
| 7,040,093 B2 * | 5/2006 | Legret et al. | ............... 60/588 |
| 7,055,322 B2 * | 6/2006 | Yasuda et al. | ............... 60/588 |
| 2003/0201417 A1 | 10/2003 | Ahn | |
| 2005/0067896 A1 | 3/2005 | Kim et al. | |
| 2007/0296270 A1 | 12/2007 | Park | |
| 2009/0090105 A1 * | 4/2009 | Taira | ............... 60/585 |

FOREIGN PATENT DOCUMENTS

WO   WO 2006126619 A1 * 11/2006

* cited by examiner

*Primary Examiner*—Thomas E Lazo
(74) *Attorney, Agent, or Firm*—Greenblum & Bernstein P.L.C.

(57) ABSTRACT

A master cylinder of a brake is disclosed. The master cylinder includes a cylinder body connected with an oil tank and defining therein a first pressure chamber and a second pressure chamber, which are separated from each other by a partition, a first piston to perform reciprocating movements in the first pressure chamber, a second piston to perform reciprocating movements in the second pressure chamber, a first return spring to elastically support the first piston in the first pressure chamber, and a second return spring to elastically support the second piston in the second pressure chamber. The first piston has a plurality of recesses formed at one end thereof to assure smooth supply of oil during braking. The master cylinder has the effects of assuring smooth supply of brake oil during braking, and preventing fluctuation of a piston therein.

5 Claims, 4 Drawing Sheets

MASTER CYLINDER OF BRAKE

BACKGROUND OF THE INVENTION

1. Field of the Invention

The present invention relates to a vehicular brake, and more particularly, to a master cylinder of a brake, which can assure smooth supply of brake oil during brake operation, and prevent fluctuation of a piston therein.

2. Description of the Related Art

Generally, a vehicular brake is used to slow or stop a vehicle, or to stably maintain a stopped state of the vehicle. During traveling, a driver frequently operates the brake to adjust traveling speed or to maintain a temporary stopped state of the vehicle. Also, when a vehicle is parked or stopped for a long-time, the brake is used to assure a stable parked state of the vehicle.

FIG. 1 is a perspective view of a conventional piston provided in an electronic brake of a vehicle.

As shown in FIG. 1, a piston 21 has a plurality of holes 22 perforated in a front end region thereof for supply of brake oil. That is, the holes 22 are used to supply brake oil. During operation of the electronic brake, brake oil is supplied to the piston 21 through a flow path formed in a cylinder body, and then, is distributed throughout the piston 21 by passing through the plurality of holes 22 arranged in a radial direction of the piston 21.

However, the above-describe conventional oil supply configuration with respect to a brake system has a problem in that the brake oil must be supplied to the overall brake system by way of the small cross sectional flow path formed in the cylinder body and small-diameter holes 22, rather than moving in a linear flow trajectory. This makes it difficult to achieve smooth flow of brake oil during braking, and results in deterioration in the operation response of a brake.

In particular, a general brake operates in a state wherein a brake pipe is filled with oil, and therefore, the form of a flow path in a master cylinder has no significant effect on brake operation. However, in consideration of the fact that operation of the electronic brake is greatly effected by the form of a flow-path defined in a master cylinder, the above-described problem is further aggravated. Therefore, there is an urgent need to improve the configuration of the flow path.

SUMMARY OF THE INVENTION

Therefore, the present invention has been made in view of the above problems, and it is an object of the present invention to provide a master cylinder of a brake, which can assure smooth supply of brake oil during brake operation, and prevent fluctuation of a piston therein.

In accordance with the present invention, the above and other objects can be accomplished by the provision of a master cylinder of a brake comprising: a cylinder body connected with an oil tank and defining therein a first pressure chamber and a second pressure chamber, which are separated from each other by a partition; a first piston to perform reciprocating movements in the first pressure chamber; a second piston to perform reciprocating movements in the second pressure chamber; a first return spring to elastically support the first piston in the first pressure chamber; and a second return spring to elastically support the second piston in the second pressure chamber, wherein the first piston has a plurality of recesses formed at one end thereof to assure smooth supply of oil during braking.

Preferably, the recesses of the first piston are arranged along a circumference of the end of the first piston with a predetermined interval.

More preferably, the recesses of the first piston have a U-shaped form.

Preferably, the first piston has a plurality of protrusions arranged along a circumference of the end thereof to prevent fluctuation of the first piston during reciprocating movements thereof.

Preferably, the second piston has a plurality of recesses formed at one end thereof to assure smooth supply of oil during braking.

More preferably, the recesses of the second piston are arranged along a circumference of the end of the second piston with a predetermined interval.

More preferably, the recesses of the second piston have a U-shaped form.

More preferably, the second piston has a plurality of protrusions arranged along a circumference of the end thereof to prevent fluctuation of the second piston during reciprocating movements thereof.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, a master cylinder of a brake according to a preferred embodiment of the present invention will be described with reference to the accompanying drawings. For convenience of description, a master cylinder provided in a vehicular brake will be described as an example. In the following description, the thickness of lines or the size of constituent elements may be exaggerated for the clear understanding and convenience of description. Also, the terms used in the following description are terms defined taking into consideration the functions obtained in accordance with the present invention, and may be changed in accordance with the option of a user or operator or a usual practice. Therefore, the definitions of these terms should be determined based on the whole content of this specification.

Figure 1:
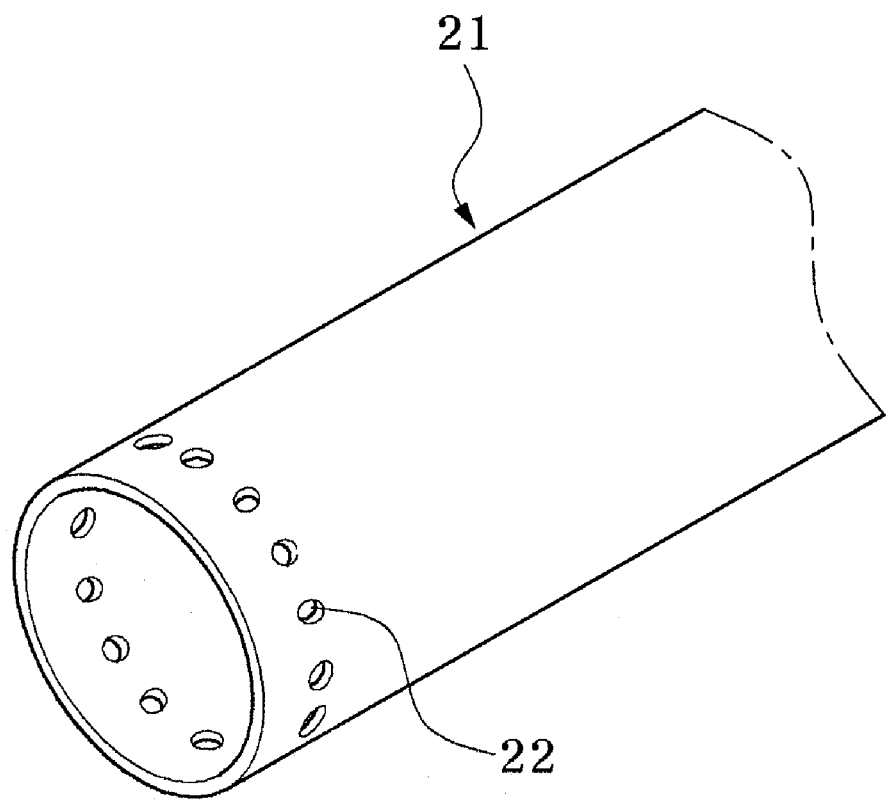
FIG. 1 is a perspective view of a conventional piston.
Figure 2:
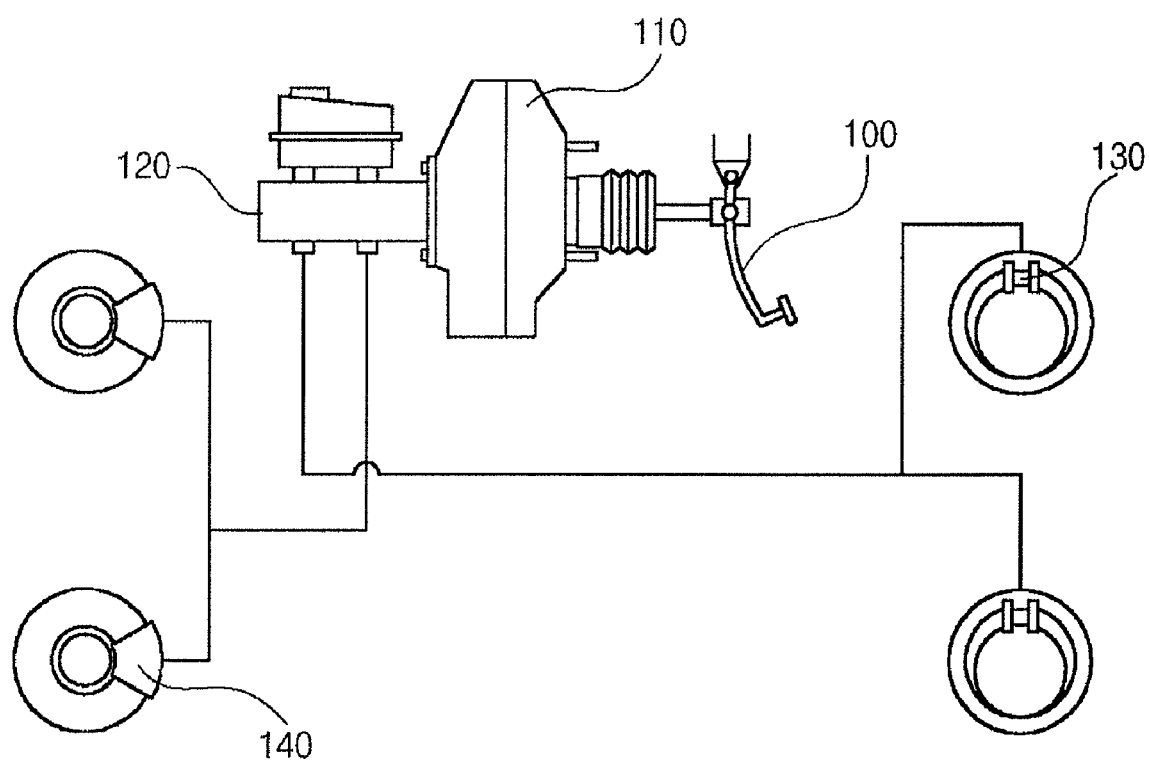
FIG. 2 is a diagram illustrating configuration of a brake according to an embodiment of the present invention.
Figure 3:
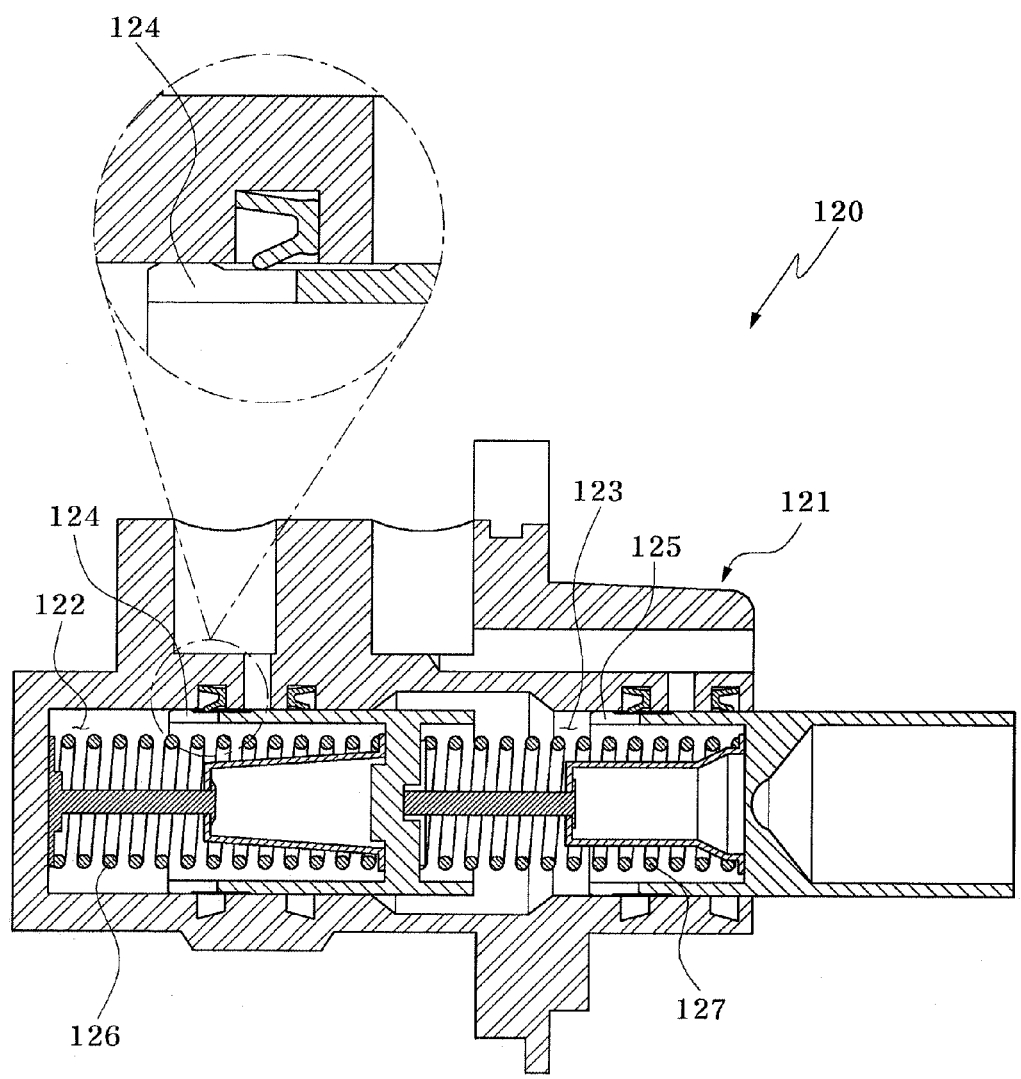
FIG. 3 is a sectional view illustrating a master cylinder of the brake according to the embodiment of the present invention.
Figure 4:
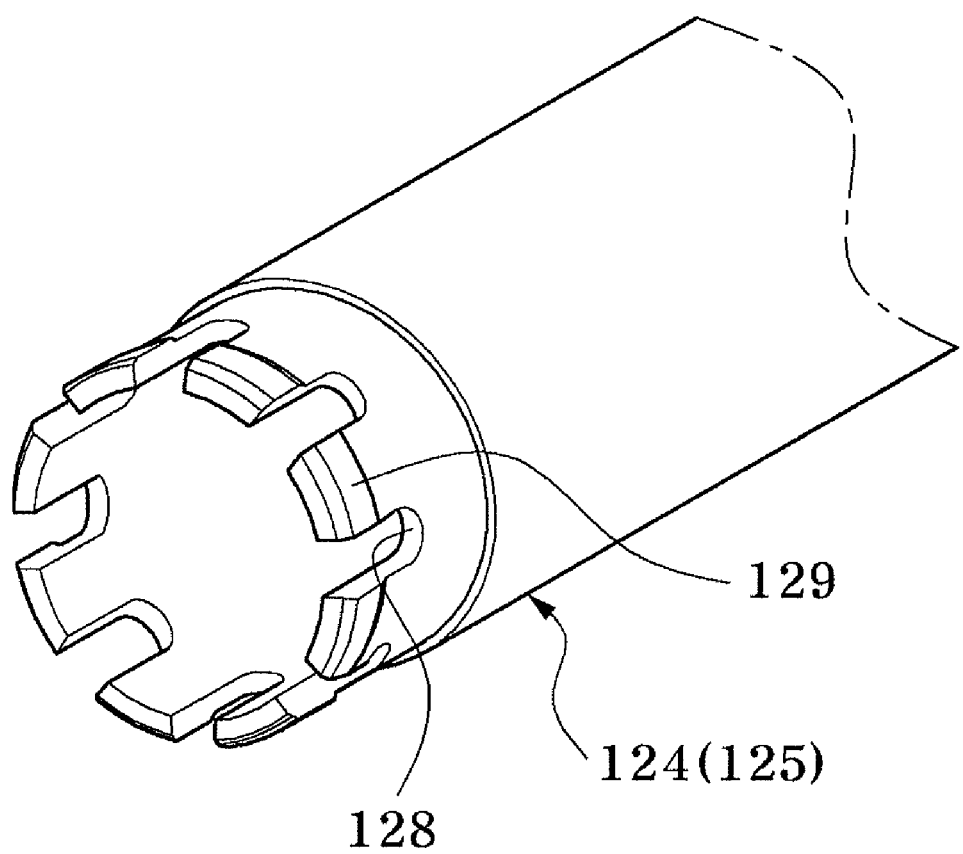
FIG. 4 is a perspective view of a piston provided in the master cylinder according to the embodiment of the present invention.

FIG. 2 is a diagram illustrating configuration of a brake according to an embodiment of the present invention. FIG. 3 is a sectional view illustrating a master cylinder of the brake according to the embodiment of the present invention. FIG. 4 is a perspective view of a piston provided in the master cylinder according to the embodiment of the present invention.

As shown in FIGS. 2 to 4, a brake device includes a brake pedal 100 to be operated by a driver for slowing or stopping a vehicle, a booster 110 to amplify an operating force of the brake pedal 100 via negative pressure applied from an engine suction mechanism, a master cylinder 120 to generate a high brake pressure by operation of the booster 110, and wheel cylinders 130 or caliper cylinders 140 to perform a braking operation by catching a wheel brake drum using hydraulic pressure applied from the master cylinder 120.

In operation of the above-described brake device, if the driver operates the brake pedal 100 during traveling, the booster 110 amplifies the operating force of the brake pedal 100, generating high hydraulic pressure in the master cylinder 120. As the generated hydraulic pressure acts on the wheel cylinders 130 or caliper cylinders 140, a braking force can be applied to wheels by piston operation.

The master cylinder 120 is used to generate a braking force depending on operation of a brake pedal by a driver, and includes an oil tank (not shown), a cylinder body 121, a first piston 124, a second piston 125, a first return spring 126, and a second return spring 127.

The oil tank is installed at the upper side of the cylinder body 121 and is used to store brake oil therein. The cylinder body 121 is connected with the oil tank, to receive the brake oil supplied from the oil tank.

The cylinder body 121 is composed of a first pressure chamber 122 and a second pressure chamber 123, which are separated from each other by a partition.

The first piston 124 is provided, in a forward and rearward reciprocating movable manner, in the first pressure chamber 122. Likewise, the second piston 125 is provided, in a forward and rearward reciprocating movable manner, in the second pressure chamber 123.

The first piston 124 has a plurality of recesses 128 formed at a front end thereof to assure smooth supply of brake oil during braking. The recesses 128 of the first piston 124 are arranged along the circumference of the front end of the first piston 124 with a predetermined interval. Each recess 128 has a U-shaped form having a rounded end.

As a result of forming the recesses 128 at the first piston 124, linear flow of brake oil can be accomplished, thus allowing the brake oil to be smoothly distributed throughout the master cylinder 120 during braking. Also, by virtue of the U-shaped form of each recess 128, a seal cup (not shown), which is in direct contact with the front end of the first piston 124, undergoes minimal deformation even under continuous reciprocating movement of the first piston 124. This has the effect of improving the durability of the seal cup. Further, rounding of the recess 128 prevents concentration of stress caused by internal pressure of the first pressure chamber 122, and consequently, has the effect of improving the durability of the first piston 124.

The first piston 124 further has a plurality of protrusions 129 arranged along the circumference of the front end thereof. The protrusions 129 are configured to come into contact with an inner circumferential surface of the first pressure chamber 122, to prevent unwanted fluctuation of the first piston 124 during forward and rearward reciprocating movements of the first piston 124.

Likewise, the second piston 125 has the plurality of recesses 128 formed at a front end thereof to assure smooth supply of brake oil during braking. The recesses 128 of the second piston 125 are arranged along the circumference of the front end of the second piston 125 with a predetermined interval. Each recess 128 has a U-shaped form having a rounded end.

As a result of forming the recesses 128 at the second piston 125, linear flow of brake oil can be accomplished, and this allows the brake oil to be smoothly distributed throughout the master cylinder 120 during braking. Also, by virtue of the U-shaped form of each recess 128, a seal cup (not shown), which is in direct contact with the front end of the second piston 125, has only a minimum deformation even by continuous reciprocating movements of the second piston 125. This has the effect of improving the durability of the seal cup. Further, rounding of the recess 128 prevents concentration of stress caused by internal pressure of the second pressure chamber 123, and consequently, has the effect of improving the durability of the second piston 125.

The second piston 125 further has the plurality of protrusions 129 arranged along the circumference of the front end thereof. The protrusions 129 are configured to come into contact with an inner circumferential surface of the second pressure chamber 123, to prevent unwanted fluctuation of the second piston 125 during forward and rearward reciprocating movements of the second piston 125.

The first return spring 126 has one end secured to a surface of the first pressure chamber 122 and the other end secured to a surface of the first piston 124, to elastically support the first piston 124 within the first pressure chamber 122.

Likewise, the second return spring 127 has one end secured to a surface of the second pressure chamber 123 and the other end secured to a surface of the second piston 125, to elastically support the second piston 125 within the second pressure chamber 123.

Hereinafter, operation of the master cylinder having the above-described configuration will be described.

If the driver operates the brake pedal 100 in a brake-release state, the first piston 124 and second piston 125 are moved, respectively, by overcoming elasticity of the first return spring 126 and second return spring 127, thereby causing the volume of the first pressure chamber 122 and second pressure chamber 123 to be constricted. Thereby, with the movements of the first piston 124 and second piston 125, internal pressure of the first pressure chamber 122 and second pressure chamber 123 is raised, and the resulting high internal pressure is directly converted into a brake oil pressure. As the brake oil pressure provides each brake line with a high brake pressure, a desired braking force can be accomplished.

Then, if the driver does not operate the brake pedal 100 in the above-described braking state, the first piston 124 and second piston 125 are returned by restitution force of the first return spring 126 and second return spring 127. In this case, negative pressure is instantaneously generated in the first pressure chamber 122 and second pressure chamber 123 via movement of the first piston 124 and second piston 125, thereby allowing the brake oil to be introduced into the first pressure chamber 122 and second pressure chamber 123. Thereby, the high internal pressure of the first pressure chamber 122 and second pressure chamber 123 is immediately released, enabling a rapid return of the first piston 124 and second piston 125.

As described above, the master cylinder 120 has the function of generating a hydraulic pressure required for braking, and the generated hydraulic pressure is transmitted to the wheel cylinders 130 or caliper cylinder 140 connected to vehicle wheels through brake lines, to apply a braking force to the wheels.

As apparent from the above description, differently from the prior art, a master cylinder of a brake according to the present invention has the effect of assuring smooth supply of brake oil during braking, and preventing fluctuation of a piston therein.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Also, the master cylinder provided in a vehicular brake has been described as on example only, and the present invention can be applied to other various master cylinders for use in various technical fields other than vehicles. Accordingly, the technical protection range of the invention should be determined by the accompanying claims.

What is claimed is:

1. A master cylinder of a brake comprising:
   a cylinder body connected with an oil tank and defining therein a first pressure chamber and a second pressure chamber, which are separated from each other by a partition;
   a first piston to perform reciprocating movements in the first pressure chamber;
   a second piston to perform reciprocating movements in the second pressure chamber;
   a first return spring to elastically support the first piston in the first pressure chamber; and
   a second return spring to elastically support the second piston in the second pressure chamber,
   wherein the first piston has a plurality of recesses formed at one end thereof to assure smooth supply of oil during braking,
   the first piston has a plurality of protrusions arranged along a circumference of the end thereof to prevent fluctuation of the first piston during reciprocating movements thereof,
   the second piston has a plurality of recesses formed at one end thereof to assure smooth supply of oil during braking,
   the second piston has a plurality of protrusions arranged along a circumference of the end thereof to prevent fluctuation of the second piston during reciprocating movements thereof,
   the recesses extend through the inner and outer peripheries of corresponding first and second pistons, and
   the protrusions protrude radially outward from a distal end of fingers defined by the recesses.

2. The master cylinder according to claim 1, wherein the recesses of the first piston are arranged along a circumference of the end of the first piston with a predetermined interval.

3. The master cylinder according to claim 2, wherein the recesses of the first piston have a U-shaped form.

4. The master cylinder according to claim 1, wherein the recesses of the second piston are arranged along a circumference of the end of the second piston with a predetermined interval.

5. The master cylinder according to claim 4, wherein the recesses of the second piston have a U-shaped form.

* * * * *